UNITED STATES PATENT OFFICE.

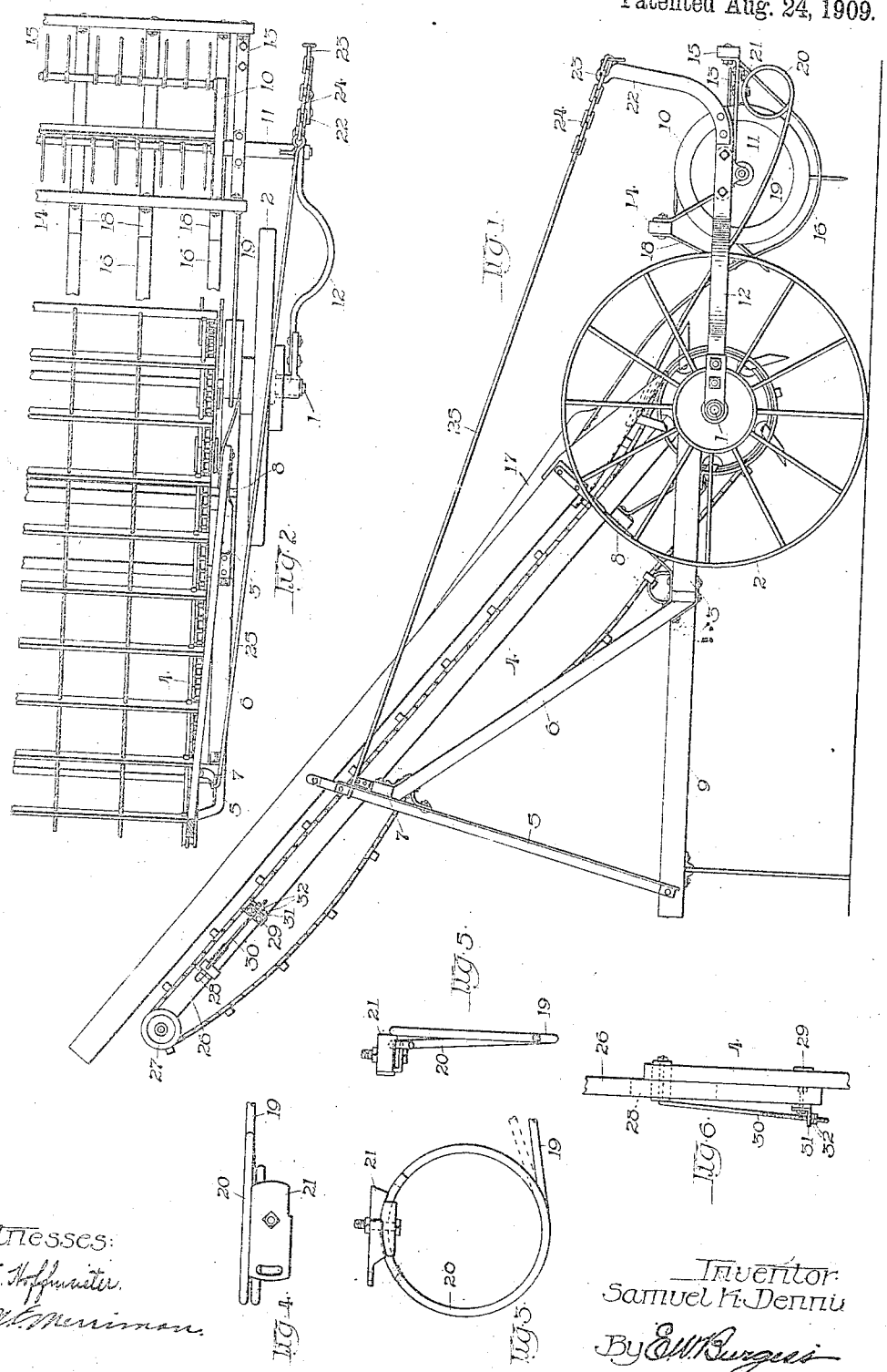

SAMUEL K. DENNIS, OF CHICAGO, ILLINOIS, ASSIGNOR TO INTERNATIONAL HARVESTER COMPANY, A CORPORATION OF NEW JERSEY.

HAY-LOADER.

931,734.  Specification of Letters Patent.  Patented Aug. 24, 1909.

Application filed February 19, 1909. Serial No. 478,828.

*To all whom it may concern:*

Be it known that I, SAMUEL K. DENNIS, a citizen of the United States, residing at Chicago, in the county of Cook and State of Illinois, have invented certain new and useful Improvements in Hay-Loaders, of which the following is a specification.

My invention relates to the raking cylinder type of hay loaders, and includes improved means for supporting the floating raking cylinder on the machine frame, to an improved construction of wheel guard, and to improved means for extending the length of the side bars of the elevator frame in a manner to control the tension of the endless carrier.

The objects of my invention are to simplify the construction of the machine and increase its efficiency of operation. I attain these objects by means of the mechanism illustrated in the accompanying drawing, in which the same reference characters represent like parts throughout the several views.

Figure 1 is a side elevation of a hay loader having my invention embodied therein; Fig. 2 is a partial top plan view of Fig. 1; Fig. 3 is a side elevation of part of the wheel guard mechanism; Fig. 4 is a top view of Fig. 3; Fig. 5 is an end view of Fig. 3; and Fig. 6 is a detached detail of the elevator frame structure designed to illustrate the means for extending or contracting the length of the side bars thereof.

1 represents the axle; 2 one of the carrying and traction wheels; 3 the bed frame pivotally connected with the axle; 4 one of the side bars, the elevator frame having its lower end secured to the bed frame and its upper end supported thereon by means of a standard 5 and an inclined brace member 6, and 7 and 8 represent transverse frame members forming part of the elevator frame, and 9 represents a draft member whereby the machine may be operatively connected with a wagon.

10 is a raking cylinder journaled in bearings 11 at opposite ends thereof, the bearings being secured to the rear ends of the side bars 12, having their forward ends pivotally connected with the axle in a manner permitting the cylinder to float upon the surface of the ground.

13 represents longitudinally arranged frame bars secured to the inner ends of the bearing members 11 and having secured thereto transverse bars 14 and 15, forward and in rear of the axis of the cylinder, respectively, and 16 designates clearer bars having their rear ends secured to bar 15 and, partially encircling the cylinder upon its lower side, extending forward and upward and having their front ends secured to the lower ends of floating bars 17 adapted to press yieldingly upon the stream of hay as it is advanced upward along the elevator deck; and 18 represents supplemental supports for the clearer bars having one end connected with the bars and their opposite ends with the transverse bar 14.

19 designates wheel guards arranged upon opposite sides of the machine, having an open coil 20 at their rear ends, the upper side of the coil being secured to the bars 13 in rear of the axis of the cylinder by means of adjustable clips 21, the forward ends of the guards extending forward and upward near the inner side of the traction wheels in a manner to yieldingly press upon the hay that is being delivered to the elevator and separate it from the swath being operated upon.

22 designates rearwardly and upwardly curved bars having their lower ends secured to the rear ends of side bars 12 and provided with hook portions 23 at their upper ends that are adapted to receive links of chain 24 that are connected with the elevator frame near its upper end by means of tension rods 25, the chains being operative in a manner to adjust the height of the cylinder relative to the ground line. The upper ends of the elevator frame members 4 are provided with adjustable supplemental members 26, having the endless carrier shaft 27 journaled at their outer ends and provided with a longitudinal slot 28. Loops 29 are secured to the lower ends of the supplemental bars and slidably mounted upon the frame bars 4.

30 represents tension rods having their upper ends turned inward in L-form and adapted to pass loosely through the slotted portion of the bars and be secured to the upper ends of the bar 4, the lower ends of the rods being threaded and passed through openings in clips 31 secured to loops 29, and 32 designates adjusting nuts whereby the supplemental bars may be adjusted longitudinally along the bars 4 in a manner to extend or contract the operative length of the elevator frame.

What I claim as my invention, and desire to secure by Letters Patent, is:

1. A hay loader including, in combination, an axle, carrying wheels mounted upon opposite ends of said axle, a raking cylinder, a frame in which said cylinder is journaled, and resilient wheel guards having their rear ends secured to said frame and their forward ends extending upward in proximity to the inner sides of said carrying wheels.

2. A hay loader including, in combination, an axle, carrying wheels mounted upon opposite ends of said axle, a raking cylinder, a frame in which said cylinder is journaled, wheel guards having open coils at their rear ends, said coils being adjustably secured to opposite sides of said frame, the forward ends of said guards extending upward in proximity to the inner sides of said wheels.

SAMUEL K. DENNIS.

Witnesses:
JAMES A. MOXEY,
EVAN EVANS.